Feb. 28, 1956     C. L. CONNER     2,736,206
TIGHTENING MEANS FOR ENDLESS CHAINS
Filed May 9, 1952
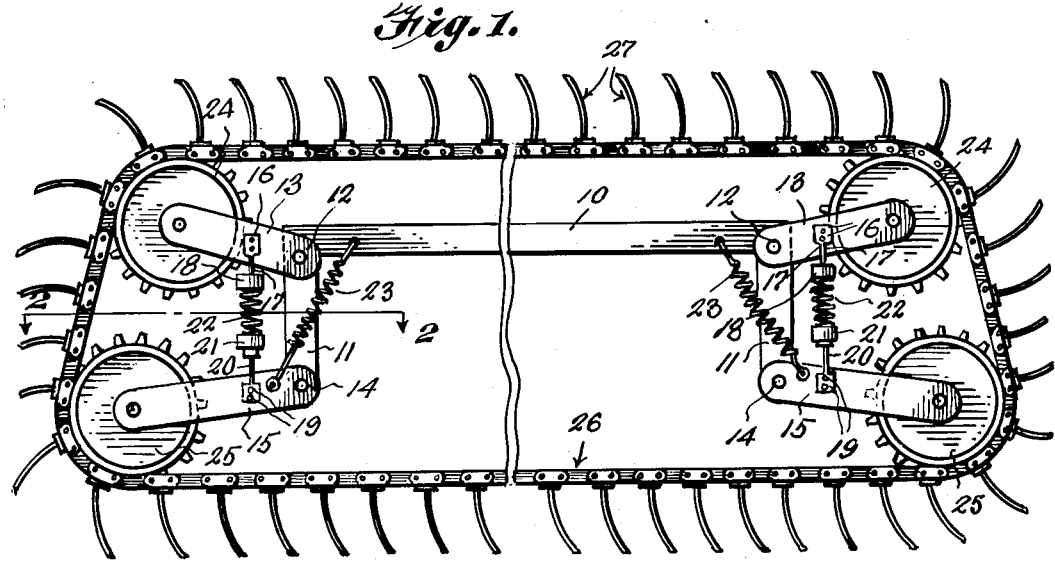
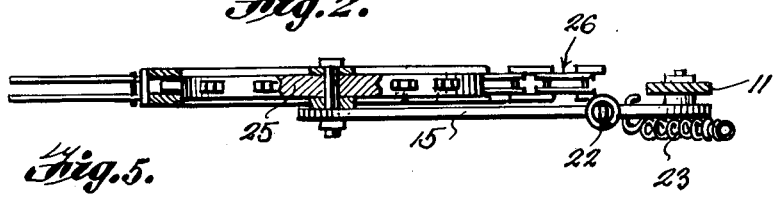
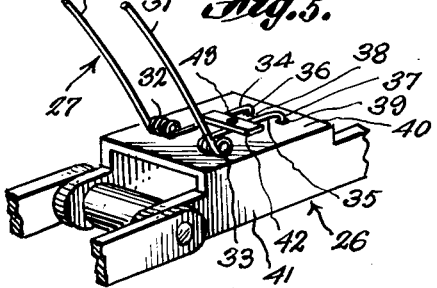
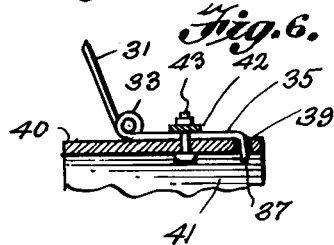
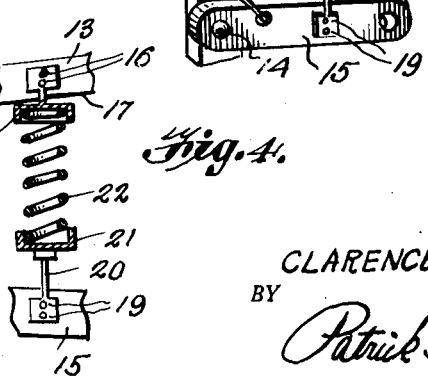
INVENTOR.
CLARENCE L. CONNER
BY
*Patrick D. Beavers*
ATTORNEY

United States Patent Office 2,736,206
Patented Feb. 28, 1956

2,736,206

TIGHTENING MEANS FOR ENDLESS CHAINS

Clarence L. Conner, McFarland, Calif.

Application May 9, 1952, Serial No. 286,939

2 Claims. (Cl. 74—242.11)

The present invention relates to an improved tightening means for endless chains which embodies certain of the features of my patent No. 2,545,723, dated March 20, 1951, and it consists in the combinations, constructions and arrangements of parts herein described and claimed.

Generally the invention comprises an endless type of hay rake consisting of a frame having a plurality of outwardly extending arms pivotally connected to the frame and having a sprocket revolubly mounted in each of the outer ends of the arms. An endless chain is mounted upon the sprockets and is provided with a plurality of spaced outwardly extending tines. One of the novel features of the present invention is the provision of automatic means for adjusting the tension and position of the endless chain upon the sprockets above referred to.

Still another object of the invention is the provision of a novel mounting for an endless chain forming a part of the invention.

An object of the invention is the provision of a novel tensioning means for an endless chain construction.

Other and further objects of the invention will become apparent from a reading of the following specification taken in conjunction with the drawing, in which:

Figure 1 is a side elevational view of an embodiment of the invention.

Figure 2 is an enlarged fragmentary sectional view taken along line 2—2 of Figure 1, Figure 3 is a fragmentary perspective view illustrating certain springs and attendant mechanisms forming a part of the invention, Figure 4 is an enlarged fragmentary elevational view, partly in section, illustrating a compression spring forming a part of the invention, Figure 5 is a fragmentary perspective view illustrating a tine construction forming a part of the invention, and Figure 6 is a fragmentary vertical sectional view of the device illustrated in Figure 5.

Referring more particularly to the drawing, there is shown therein an improved rotary side delivery rake adapted to be empowered by and carried by a tractor (not shown) and including an inverted U-shaped frame having an elongated bight portion 10 and a pair of relatively short vertically dependent legs 11. Pivotally connected to the upper portion of each of the legs 11, as indicated at 12 is one end of an upper arm 13, in each case.

Pivotally connected to the lower portion of each of the legs 11, as indicated at 14, is the inner end of a lower arm 15, likewise in each case. The arms 15 are identical in size and the arms 13 are identical in size but the arms 15 are slightly longer than the arms 13.

Affixed to each of the upper arms 13 by means of rivets 16 or the like is a dependent arm 17 having a socket 18 at its lower end and affixed to each of the lower arms 15 by means of rivets 19 or the like is an upwardly extending arm 20 having a socket 21 at its upper end in each case. Interposed between each of the sockets 18 and its associated socket 21 is a compression spring 22. A tension spring 23 is provided for each of the lower arms 15 and each of the springs 23 connects with an arm 15 immediately outwardly of its pivotal point 14 and with the bight portion 10 at a point adjacent the nearby leg 11 as clearly shown in Figure 1.

Pivotally mounted in the outer end of each of the upper arms 13 is a sprocket 24 and pivotally mounted in the outer end of each of the lower arms 15 is a sprocket 25. Entrained over the sprockets 24 and 25 is an endless chain generally designated at 26 and which is provided with a plurality of spaced pairs of tines generally designated at 27.

In the operation of this part of the invention, it will be apparent that the compression springs 22 will act to normally move the upper arms 13 away from their associated lower arms 15 thus causing the sprockets 24 and 25 at either end of the assembly to be normally moved away from each other thus tensioning the endless chain 26 at all times. It will also be apparent that the tension springs 23 will act to lift the lower arms 15 in an upward direction which action will tend to likewise move, through the action of the compression springs 22, the upper arms 13 in an upward direction, thus maintaining the proper conformation of the endless chain 26 and its attached tines.

Referring now particularly to Figures 5 and 6, it will be seen that each pair of tines 27 is composed of two individual tines 30 and 31 each of which is integrally connected by a spring portion 32 and 33, respectively, with a foot portion 34 and 35, respectively. Each of the foot portions 34 and 35 is provided with an inwardly directed hook portion 36 and 37, respectively, which are adapted to fit into holes 38 and 39, respectively, formed in the outer face 40 of a solid link 41 in the chain 26. A clip 42 extends transversely over the feet 34 and 35 and is centrally secured to the link 41 by means of a bolt 43 or the like.

In this portion of the invention, it will be apparent that if one of the tines 30 or 31 should be damaged or broken, that the same may be quickly and easily replaced without the necessity of replacing both of the tines 30 and 31 by merely removing the clip 42 by loosening the bolt 43 and thereafter removing the hook portions 36 or 37 as the case may be from its associated opening 38 or 39 and thereafter replacing the same with a new tine and clipping the same by means of the member 42 and the bolt 43.

While but one form of the invention has been shown and described herein, it will be readily apparent to those skilled in the art that many minor modifications may be made without departing from the spirit of the invention or the scope of the appended claims.

What is claimed is:

1. A device of the character described comprising a frame of inverted U-shape having an elongated bight portion and a pair of dependent legs, a pair of upper arms each pivotally connected to the upper portion of one of said legs, a pair of lower arms each pivotally connected to the lower end of one of said legs, a compression spring interposed between the pair of arms pivoted to each leg, a sprocket mounted upon the outer end of each arm, and an endless chain entrained over all of said sprockets, said upper arms being of lesser length than said lower arms.

2. A device as defined in claim 1 wherein said bight portion is interconnected with each of said lower arms by means of a tension spring.

References Cited in the file of this patent

UNITED STATES PATENTS

| Re. 19,137 | Wright et al. | Apr. 17, 1934 |
| 433,133 | McDonald | July 29, 1890 |
| 2,511,100 | Clark | June 13, 1950 |
| 2,545,723 | Conner | Mar. 20, 1951 |
| 2,639,623 | Ausherman | May 26, 1953 |